United States Patent Office 3,336,391
Patented Aug. 15, 1967

3,336,391
SYNTHESIS OF KETONES AND SULFONES
Warren I. Lyness, Mount Healthy, and David E. O'Connor, Cincinnati, Ohio, assignors to The Procter & Gamble Company, Cincinnati, Ohio, a corporation of Ohio
No Drawing. Filed Mar. 30, 1965, Ser. No. 444,077
6 Claims. (Cl. 260—593)

This application is a continuation-in-part of the copending application of Warren I. Lyness, David E. O'Connor and Jim S. Berry, Ser. No. 246,351, filed Dec. 21, 1962 now abandoned.

This invention relates to a process for preparing carbanions containing keto groups or sulfonyl groups. Specifically, this invention relates to a process for reacting alkali metal salts of alkyl sulfinyl carbanions with ketones and sulfones.

Carbanions containing keto and sulfonyl groups are known in the prior art. Prior processes for preparing these carbanions have involved the use of expensive materials in order to provide adequate mixing of the strong base material and the ketone or sulfone.

Accordingly, it is an object of this invention to provide a simple, inexpensive process for preparing carbanions containing a keto or a sulfonyl group.

The objects of this invention can be achieved by reacting (A) Salts of sulfinyl carbanions having the formula

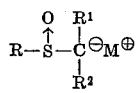

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are selected from the group consisting of hydrogen and hydrocarbon groups containing from about 1 to about 30 carbon atoms, and wherein R, $R^1$ and $R^2$ each contain from 0 to about 10 linkages selected from the group consisting of ether, thioether and imino linkages, and from 0 to about 5 amine groups each selected from the group consisting of primary, secondary and tertiary amine groups, and are not more reactive with a strong base than a hydrogen atom attached to a saturated carbon atom adjacent to the sulfoxide group and wherein the total number of carbon atoms in the sulfoxide compound does not exceed about 32, and not more than two of the hydrocarbon groups in the compound contain aryl groups, and wherein M is an alkali metal, with (B) A compound having the formula

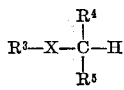

wherein X is selected from the group consisting of

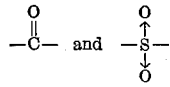

wherein $R^3$ is selected from the group consisting of alkyl chains containing from 1 to about 22 carbon atoms, aryl groups containing from 6 to about 12 carbon atoms, and alkyl aryl groups containing an aryl group selected from the group consisting of benzene and naphthalene containing alkyl chains containing from 1 to about 18 carbon atoms and mixtures thereof; and wherein $R^4$ and $R^5$ are each selected from the group consisting of hydrogen and alkyl groups containing from 1 to about 22 carbon atoms. The reaction is carried out at a temperature of from about 0° C. to about 100° C.

R, $R^1$, $R^2$, $R^3$, $R^4$ and $R^5$ have the above definitions wherever they appear herein. A more complete discussion of these groups appears hereinafter.

The above reaction proceeds as follows:

*Reaction between sulfinyl carbanions and ketones*

Ketones having a hydrogen attached to a carbon atom adjacent to the keto group react with the salts of sulfinyl carbanions of this invention to remove said hydrogen and form a salt of a new carbanion.

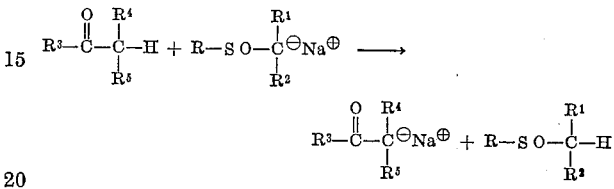

R, $R^1$, $R^2$, $R^3$, $R^4$ and $R^5$ have the definitions hereinbefore given.

Non-reactive groups such as ether and thioether linkages can be present in the chains. Preferred salts are the alkali metal salts of acetyl carbanion.

These salts of ketocarbanions are useful intermediates which in turn can be alkylated by reacting the carbanion with, for example, alkyl halides (as described hereinafter) to form an alkylation product and which can be used as an intermediate in preparing, for example, surface active agents. When the salt of the sulfinyl carbanion used is an alkali metal methylsulfinylcarbanion (e.g., the sodium salt thereof) in dimethyl sulfoxide solution, the formation of the ketocarbanion is unusually facile because a homogeneous solution of a strong base (alkali metal methylsulfinylcarbanion) is available for reaction.

*Reaction between sulfinyl carbanions and sulfones*

Sulfones having a hydrogen atom attached to a carbon atom adjacent to the sulfone group will react with the salts of sulfinyl carbanions of this invention to remove said hydrogen and form a salt of a sulfonecarbanion which is useful as an intermediate in preparing, for example, water proofing agents.

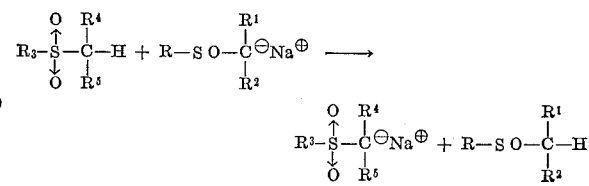

R, $R^1$, $R^2$, $R^3$, $R^4$ and $R^5$ have the definitions hereinbefore given.

Non-reactive groups such as ether and thioether linkages can be present in the chain. Preferred salts are the alkali metal salts of methylsulfonyl carbanion.

When the salt of the sulfinyl carbanion used is an alkali metal methylsulfinylcarbanion (e.g., the sodium salt thereof) in dimethyl sulfoxide solution, the formation of the sulfonecarbanion occurs with remarkable facility because of the homogeneity of the system.

The symbol used for the sulfoxide groups

is only a convenient representation of the structure for purposes of the description of the invention and is not necessarily indicative of the actual structure which is believed to involve a semi-polar bond. This symbol or even more simply (—SO—) is used hereinbefore and hereinafter to represent the sulfoxide group.

As used herein, the term "hydrocarbon groups" refers to both unsubstituted hydrocarbon groups and substituted hydrocarbon groups containing, for example, ether linkages. Preferably the substituent hydrocarbon groups (R) in the formulas above and below are alkyl chains, straight or branched, containing from 1 to about 22 carbon atoms (e.g., methyl, ethyl, n-propyl, isopropyl, n-butyl, isobutyl, n-pentyl, isopentyl, n-hexyl, n-heptyl, n-octyl, isooctyl, 2-ethylhexyl, diisobutyl, n-nonyl, tripropylene, n-decyl, undecyl, n-dodecyl, tridecyl, n-tetradecyl, pentadecyl, n-hexadecyl, n-octadecyl, eicosyl, docosyl, vinyl, propenyl, octenyl, 10-undecenyl, 9-octadecenyl, cyclopentyl, cyclohexyl, cyclohexylmethyl, methylcyclohexyl, 2-cyclohexyldodecyl, 12-cyclohexyldodecyl, 4-dodecylcyclcyclohexyl and propynyl). Examples of other groups include aryl groups containing 6 to 12 carbon atoms (e.g., phenyl, biphenyl and naphthyl); and alkyl aryl groups containing benzene or naphthalene groups with branched or straight alkyl chains of from 1 to about 18 carbon atoms (e.g., benzyl, 2-phenyl-dodecyl, 1-methyl-2-phenylethyl, 2-indenyl and naphthylmethyl). $R^1$, $R^2$, $R^3$ and $R^4$ are each selected from the group consisting of hydrogen and hydrocarbon groups which are the same as those examples given hereinbefore with respect to R. The presence of certain non-reactive groups in or on the substituent R, $R^1$, $R^2$, $R^3$ or $R^4$ groups is permissible. As an example of non-reactive groups, these substituent groups can contain up to about 10 ether and/or thio-ether linkages. Up to five amino groups can be appended to the chain or up to ten imino $$\underset{\mathrm{H}}{(-\mathrm{N}-} \text{ or } -\mathrm{N}=)$$

groups can form a part of the chain with open chain and/or cyclic configuration. (R, $R^1$ and $R^2$, have the above definitions throughout the specification and claims.) Thus, R, $R^1$, $R^2$, $R^3$ or $R^4$ can represent, for example, such groups as 3,6,9,12,15-pentathiaheptacosanyl; 3,6,9,-12,15-pentaoxaheptacosanyl; 3,6,9-trithiaheptacosanyl; 3,-6,9-trioxaheptacosanyl; 2-dodecyloxyethyl; 2-octadecyloxyethyl; 2-methoxyethyl; 2-ethoxyethyl; 2-hexyloxyethyl; 2-octyloxyethyl; 2-dodecylthioethyl; 2-octadecylthioethyl; 2-methylthioethyl; 2-ethylthioethyl; 2-hexylthioethyl; 2-octylthioethyl; 11-methoxyundecyl; 11-methylthioundecyl; 11-ethoxyundecyl; 9- or 10-methoxyoctadecyl; 9- or 10-ethoxyoctadecyl; 9- or 10-methylthiooctadecyl; 2-, 3-, or 4-methoxycyclohexyl; 3- or 4-methylthiocyclohexyl; 3-cyclohexyloxydecyl; 2,5,8,11,14-pentamethyl-3,6,9,-12,15-pentaoxaheneicosanyl; 2-tetrahydrofuranyl; 2-tetrahydrothiophenyl; tetrahydropyranyl; β-(tetrahydropyranyl)-ethyl; β-(2-tetrahydrofuranyl)-ethyl; tetrahydrothiofuranyl; 3,6-dioxaheptyl; 3,6-dithiaheptyl; 3,6,9-triazaheneicosanyl; β-aminoethyl; β-aminopropyl; β-methylamino ethyl; β-methylaminopropyl; β-dimethylaminoethyl; β-dimethylaminopropyl; 5-amino-3-azapentyl; 5-dimethylamino-3-azapentyl; 5-dimethylamino-3-methazapentyl; 8-amino-3,6-diazaoctyl; 15-amino-3,6,9,12-tetrazapentadecyl; 4,6-dimethoxy-2-sym-triazinyl; 4,6-diamino-2-sym-triazinyl; 4-piperidyl; β-(N-piperidyl)-ethyl; β-(N-piperazinyl)-ethyl; β-(N-imidazolyl)-ethyl; β-(N-morpholino)-ethyl; β-(N-oxazolyl)-ethyl; β-(N-pyrrolidyl)-ethyl; and 2-thiazolyl. Additionally, R can represent, for example, β-N-anilinoethyl; β-N-anilinopropyl; β-N-pyridylethyl; 1-methoxy-2-indanyl; β-N-naphthylaminoethyl; 2-benzoxazolyl and 4,6-dianilino-2-sym-triazinyl.

It will be understood that more than one sulfinyl carbanion group can be present in the molecule of component (A). This is to say there can be more than one

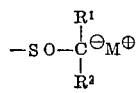

Preferably $R^1$ and $R^2$ in these additional groups are hydrogen atoms. The two sulfinyl carbanion groups should be separated by at least three aliphatic carbon atoms, but can be attached to adjacent carbon atoms on a benzene ring. Polymers containing multiple pendant alkali metal sulfinyl carbanion groups are desirable as reactants. The restriction on the number of carbon atoms which can be present in the molecule is, of course, different when more alkali metal sulfinyl carbanion groups are present. The number of carbon atoms per alkali metal sulfinyl carbanion group should not exceed 32, however.

An especially preferred group of reactants are those wherein the R group contains from 1 to about 22 carbon atoms or is a phenyl group and $R^1$ and $R^2$ are hydrogen atoms or alkyl chains containing from 1 to about 22 carbon atoms. The preferred reactants are the alkali metal salts of methylsulfinylcarbanion such as sodium or potassium salts because these salts undergo the aforementioned reactions with remarkable facility.

Dimethyl sulfoxide is an excellent solvent for the reactions of this invention and in most instances an excess of dimethyl sulfoxide is the preferred solvent. However, other non-reactive solvents or diluents can be used, especially other sulfoxide compounds. These solvents preferably should not contain any reactive constituent either as part of the structure of the solvent or as part of impurities present in the solvent if maximum yields are desired. The use of solvents which will react with the salts of the carbanion is generally undesirable.

Suitable non-reactive solvents or diluents for the above reactions of salts of sulfinyl carbanions and ketone and/or sulfone compounds are to be found in such classes of compounds as the aliphatic or aromatic hydrocarbons, aliphatic, aromatic or mixed aliphatic-aromatic ethers, cyclic ethers and amines. Examples of suitable non-reactive hydrocarbon solvents include hexane, petroleum ether, "Stoddard" solvent, benzene, toluene and mixed xylenes. Among the ether compounds which are suitable as solvents are diethyl ether, dibutyl ether, anisole, diphenyl ether, tetrahydrofuran, 1,2-dimethoxyethane and diethylene glycol dimethyl ether. Amine compounds which can serve as solvents for the reactions of this invention include butylamine, N-methyl butylamine, anhydrous ethylene diamine, pyridine and morpholine. Anhydrous liquid ammonia can also be used as a solvent. Still another compound which is suitable is N,N-dimethyl formamide. Other suitable non-reactive solvents or diluents can be used with substantially equivalent results.

The rate and course of the above reactions can be affected by the choice of solvent. The use of mixtures of two or more non-reactive compounds as the reaction medium is, of course, suitable and in some cases preferable to the use of a single species.

The reactions of this invention are normally carried out at about room temperature (25° C.); temperatures of from about 0° C. to about 100° C. can be used; and medium is, of course, suitable and in some cases preferable to the use of a single species.

Carbon metal bonds are unstable at elevated temperatures and at 120° C., for instance, sodium methylsulfinylcarbanion is destroyed. Therefore, elevated temperatures above the decomposition temperature of the carbanion are undesirable. Lower temperatures than 20° C. are not normally desirable because of economic considerations.

Sodium and potassium salts of the sulfinyl carbanions and mixtures thereof are preferred for stability and cost considerations.

*Reaction between alkyl halides and keto and/or sulfonyl carbanions*

The salts of keto and/or sulfonyl carbanions of this invention can be used in many ways to prepare useful compounds. For instance, the salts of these carbanions will react with a compound containing a halogen atom (excepting fluorine) attached to a primary alkyl carbon atom to alkylate the ketone and/or sulfonyl carbanions. This reaction proceeds in a straight forward manner. The alkyl halide as typified by an alkyl bromide, but which can be a chloride or iodide, reacts with the alkali metal ketone and/or sulfonyl carbanion to form an alkali metal halide and to alkylate the carbanion.

These alkyl halides have the formula:

$$R^6—CH_2—X$$

wherein X is selected from the group consisting of bromine, chlorine and iodine atoms and $R^6$ is selected from the group consisting of hydrogen and alkyl and aryl-substituted alkyl hydrocarbon chains containing from 1 to about 30 carbon atoms wherein the carbon of $R^6$ joining $R^6$ to the —$CH_2X$ group is attached to the rest of the $R^6$ group by single covalent bonds. The alkyl portions of $R^6$ can contain from 0 to about 10 linkages selected from the group consisting of ether and thioether linkages. (X and $R^6$ have the above definition throughout the specification and claims, except where otherwise specifically indicated.) The reactions proceed as follows:

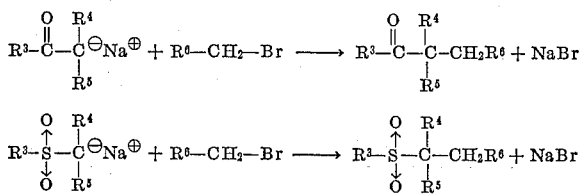

These reactions are carried out at a temperature of from about 0° C to about 100° C. Any branched, ring, or straight chain hydrocarbon, whether saturated or unsaturated, containing a halogen atom attached to a primary, saturated alkyl carbon atom and fitting the description hereinbefore given will react in the above manner. Permissible substituent groups on these hydrocarbons includes ether and thioether linkages. Examples of alkyl halide reactants suitable for use with the salts of ketone and/or sulfonyl carbanions include dodecyl bromide, dodecyl chloride, neopentyl chloride, docosyl bromide, octadecyl bromide, hexadecyl bromide, hexadecyl chloride, hexyl bromide, 3-(chloromethyl) heptane, amyl chloride, iso-amyl chloride, methyl chloride, methyl iodide, tetradecyl bromide, 1-bromo-3,6,9-trioxaheneicosane 1-bromo-3,6,9,12-tetraoxatetracosane, 2-phenylethyl bromide, cyclohevylmethyl chloride, 3-pentenyl bromide, 9-octadecenyl bromide, 10-undecenyl bromide, 1-chloro-2-methoxydodecane, 9- or 10-methoxyoctadecyl bromide, 9- or 10-methylthiooctadecyl bromide, and 1-chloro-3,6-dioxaheptane. The uses of the products of these reactions are well known and include uses as perfume compounds, water proofing compounds, and intermediates for production of same. See, e.g., Perfumes, Cosmetics and Soaps, vol. 1, Poucher, page 438 (1950), and Perfumes and Their Products, Maurer, pages 261–275 (1958). The products of these reactions are also useful as intermediates in the preparation of surfaces active compounds.

Alkyl halides containing from 1 to about 22 carbon atoms are preferred reactants, especially when the preferred ketone and/or sulfonyl carbanion salts hereinbefore described are used.

It will be understood that the alkyl halide compounds of this invention can contain more than one —$CH_2$—X group so long as the carbon of $R^6$ joins $R^6$ to the rest of the $R^6$ group by single covalent bonds and so long as the halogen atoms are not attached to adjacent carbon atoms. The presence of additional reactive sites simply allows the alkyl halide compounds to react with more than one mole of ketone and/or sulfonyl carbanion salt or as hereinafter described.

The products of this reaction are unique in that they are generally obtained in a much purer state than is possible by any other method of preparation which might be considered. As a consequence, they are less likely to have an odor or to contain ineffective or undesirable by-products.

All of these reactions with the ketone and/or sulfonyl carbanions should be carried out in the absence of any other material, as hereinbefore described, which is preferentially more reactive with strong bases than the hydrogen atom attached to a saturated carbon adjacent to the ketone and/or sulfone group of the carbanion starting material.

The following examples are illustrative but not limiting of the practice of this invention.

EXAMPLE I 9.4 g. (0.10 mole) of dimethyl sulfone was added to 0.1 mole of sodium methylsulfinylcarbanion in 100 ml. of dimethyl sulfoxide and the mixture was stirred for two hours. 24.9 g. of dodecyl bromide was then added dropwise at room temperature and the mixture was stirred for two hours, at which time the reaction was essentially complete. The mixture was allowed to stand overnight at room temperature and after separation and purification, it was found that the product contained 7.8 g. of tridecyl methyl sulfone and 8.3 g. of bis-tridecyl sulfone. No tridecyl methyl sulfoxide or bis-tridecyl sulfoxide could be found. Thus, the sodium methylsulfinylcarbanion had reacted with the sulfone to form the carbanion of the sulfone, which was subsequently alkylated. These compounds are useful as softening and water proofing agents for textiles.

EXAMPLE II 5.8 g. (0.10 mole) of acetone was added to 0.1 mole of sodium methylsulfinylcarbanion in 100 ml. of dimethyl sulfoxide. An exothermic reaction ensued. Then 24.9 g. of dodecyl bromide was added to the mixture and the mixture was stirred for two hours at which time the reaction was essentially complete. The mixture was allowed to stand overnight at room temperature, and after separation and purification, it was determined that the product consisted of 5.8 g. of bis-tridecyl ketone and 5.2 g. of methyl tridecyl ketone. The sodium methylsulfinylcarbanion had reacted with the acetone to form essentially quantitatively the carbanion of acetone, which was subsequently alkylated. Again, no long chain products containing sulfoxide groups could be found.

The bis-tridecyl ketone and methyl tridecyl ketone are useful as intermediates in the preparation of surface active agents.

When in the above examples the following groups are substituted for the methyl groups in the sodium salt of methylsulfinylcarbanion, ketone or sulfone and/or with the following groups are substituted either wholly or in part for one and/or two hydrogen atoms on the carbanion so that the total number of carbon atoms in the resulting alkali metal sulfinyl carbanion compound is less than 32, and so that there are no more than two aromatic groups present in the molecule of the alkali metal sulfinyl carbanion compound, substantially the same results are achieved in that the corresponding keto and sulfonyl carbanions are formed: methyl; ethyl; n-propyl; isopropyl; n-butyl; isobutyl; n-pentyl; isopentyl; n-hexyl; n-heptyl; n-octyl; isooctyl; 2-ethylhexyl; diisobutyl; n-nonyl; tripropylene; n-decyl; undecyl; n-dodecyl; tridecyl; n-tetradecyl; pentadecyl; n-hexadecyl; n-octadecyl; eicosyl; docosyl; vinyl; propenyl; octenyl; 10-undecenyl; 9-octadecenyl; cyclopentyl; cyclohexyl; cyclohexylmethyl; methylcyclohexyl;

2-cyclohexyldodecyl;
12-cyclohexyldodecyl;
4-dodecylcyclohexyl;
propynyl;
phenyl;
biphenyl;
naphthyl;
benzyl;
2-phenyl-dodecyl;

1-methyl-2-phenylethyl;
2-indenyl;
naphthylmethyl;
3,6,9,12,15-pentathioheptacosanyl;
3,6,9,12,15-pentaoxaheptacosanyl;
3,6,9-trithiaheptacosanyl;
3,6,9-trioxaheptacosanyl;
2-dodecyloxyethyl;
2-octadecyloxyethyl;
2-methoxyethyl;
2-ethoxyethyl;
2-hexyloxyethyl;
2-octyloxyethyl;
2-dodecylthioethyl;
2-octadecylthioethyl;
2-methylthioethyl;
2-ethylthioethyl;
2-hexylthioethyl;
2-octylthioethyl;
11-methoxyundecyl;
11-methylthioundecyl;
11-ethoxyundecyl;
9- or 10-methoxyoctadecyl;
9- or 10-ethoxyoctadecyl;
9- or 10-methylthiooctadecyl;
2-, 3-, or 4-methoxycyclohexyl;
3- or 4-methylthiocyclohexyl;
3-cyclohexyloxydecyl;
2,5,8,11,14-pentamethyl-3,6,9,12,15-pentaoxahen-
  eicosanyl;
2-tetrahydrofuranyl;
2-tetrahydrothiophenyl;
tetrahydropyranyl;
β-(tetrahydropyranyl)-ethyl;
β-(2-tetrahydrofuranyl)-ethyl;
tetrahydrothiofuranyl;
3,6-dioxaheptyl;
3,6-dithiaheptyl;
3,6,9-triazaheneicosanyl;
β-aminoethyl;
β-aminopropyl;
β-methylaminoethyl;
β-methylaminopropyl;
β-dimethylaminoethyl;
β-dimethylaminopropyl;
5-amino-3-azapentyl;
5-dimethylamino-3-azapentyl;
5-dimethylamino-3-azapentyl;
5-dimethylamino-3-methazapentyl;
8-amino-3,6-diazaoctyl;
15-amino-3,6,9,12-tetrazapentadecyl;
4,6-dimethoxy-2-sym-triazinyl;
4,6-diamino-2-sym-triazinyl;
4-piperidyl;
β-(N-piperidyl)-ethyl;
β-(N-piperazinyl)-ethyl;
β-(N-imidazolyl)-ethyl;
β-(N-morpholino)-ethyl;
β-(N-oxazolyl)-ethyl;
β-(N-pyrrolidyl)-ethyl;
2-thiazolyl;
β-(N-anilino)ethyl;
β-N-anilinopropyl;
β-N-pyridylethyl;
1-methoxy-2-indanyl;
β-N-naphthylaminoethyl;
2-benzoxazolyl;
4,6-dianilino-2-sym-triazinyl;

and mixtures thereof.

When in the above examples the corresponding potassium and lithium salts of the carbanions are substituted either wholly or in part for the sodium salts, substantially the same results are achieved in that the reaction with the ketone and/or sulfone compounds follows essentially the same path.

When in the above examples the following solvents are substituted either wholly or in part for the dimethyl sulfoxide, substantially equivalent results are obtained in that the same reactions occur: benzene, 1,2-dimethoxy ethane, hexane, petroleum ether, xylenes, diphenyl ether, tetrahydrofuran, butylamine, N,N-dimethyl formamide, or diethylene glycol dimethyl ether (diglyme), "Stoddard" solvent, toluene, pyridine, diethyl ether, dibutyl ether, anisole, N-methyl butylamine, anhydrous ethylene diamine, morpholine, anhydrous liquid ammonia, and mixtures thereof.

What is claimed is:

1. The process of forming a carbanion of a compound selected from the group consisting of ketones and sulfones comprising reacting
   (A) sodium methylsulfinylcarbanion with
   (B) a compound selected from the group consisting of dimethyl sulfone, tridecylmethyl sulfone, acetone and tridecylmethyl ketone, the reaction being carried out at a temperature of from about 0° C. to about 100° C.

2. The process of forming a carbanion of a compound selected from the group consisting of ketones and sulfones comprising reacting
   (A) a salt of a sulfinyl carbanion having the formula

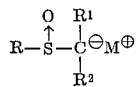

wherein R is selected from the group consisting of alkyl groups containing from 1 to about 22 carbon atoms and a phenyl group and wherein $R^1$ and $R^2$ are hydrogen atoms or alkyl chains containing from 1 to about 22 carbon atoms; and M is an alkali metal, with
   (B) a compound having the formula

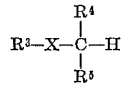

wherein X is selected from the group consisting of

and

wherein $R^3$ is selected from the group consisting of alkyl chains containing from 1 to about 22 carbon atoms, aryl groups containing from 6 to about 12 carbon atoms, and alkyl aryl groups containing an aryl group selected from the group consisting of benzene and naphthalene and alkyl chains containing from 1 to about 18 carbon atoms and mixtures thereof; and wherein $R^4$ and $R^5$ are each selected from the group consisting of hydrogen and alkyl groups containing from 1 to about 22 carbon atoms, the reaction being carried out at a temperature of from about 0° C. to about 100° C.

3. The process of claim 2 wherein $R^3$ is an alkyl group containing from 1 to about 22 carbon atoms and $R^1$, $R^2$, $R^4$, and $R^5$ are hydrogen atoms.

4. The process of claim 2 wherein Compound (A) is an alkali metal salt of methylsulfinylcarbanion.

5. The process of claim 2 in which Compound (B) is dimethyl sulfone.

6. The process of claim 2 wherein Compound (B) is acetone.

References Cited

Corey et al.: J. Am. Chem. Soc., 84, 866–867 (1962).

LEON ZITVER, *Primary Examiner.*

DANIEL D. HORWITZ, *Examiner.*